(12) United States Patent
Enyeart et al.

(10) Patent No.: US 11,195,136 B2
(45) Date of Patent: *Dec. 7, 2021

(54) BUSINESS PERFORMANCE BOOKMARKS (71) Applicant: International Business Machines Corporation, Armonk, NY (US)

(72) Inventors: David M. Enyeart, Raleigh, NC (US); Kevin P. McAuliffe, Yorktown Heights, NY (US); Billy R. Rowe, Jr., Apex, NC (US); Eric D. Wayne, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/654,690

(22) Filed: Oct. 16, 2019

(65) Prior Publication Data
US 2020/0050994 A1  Feb. 13, 2020

Related U.S. Application Data

(63) Continuation of application No. 11/624,785, filed on Jan. 19, 2007, now Pat. No. 10,515,329.

(51) Int. Cl.
*G06Q 10/06* (2012.01)
*G06Q 40/00* (2012.01)
*G06F 16/44* (2019.01)

(52) U.S. Cl.
CPC ....... *G06Q 10/06393* (2013.01); *G06Q 40/00* (2013.01); *G06F 16/447* (2019.01); *G06Q 10/06395* (2013.01)

(58) Field of Classification Search
None
See application file for complete search history.

(56) References Cited

U.S. PATENT DOCUMENTS 6,359,637 B1 * 3/2002 Perkins ............... G06F 16/9027
715/853
6,876,988 B2  4/2005 Helsper et al.
(Continued)

OTHER PUBLICATIONS

Mathieu et al., "Towards Pro-Active Information System Management In Virtual Enterprises", INCOM' 2006: 12th IFAC/IEEE/IMS Symposium Information Control Problems in Manufacturing, May 17-19, 2006, Saint-Etienne, France, pp. 697-702.
(Continued)

*Primary Examiner* — Ivan R Goldberg
(74) *Attorney, Agent, or Firm* — Scully, Scott, Murphy & Presser, PC; Robert Shatto, Esq.

(57) ABSTRACT

A performance bookmark of a dashboard view is created, e.g., in response to a triggering event. The performance bookmark includes a name, a timestamp, a reference to the visual properties of the dashboard view at the time that the performance bookmark is created and a reference to relationships of information displayed by the dashboard view at the time the performance bookmark is created. When a performance bookmark is recalled, the dashboard view is configured to correspond with the visual properties and relationships of information recorded at the time the select performance bookmark was created. Performance bookmarks are instances and relationships, and are not limited to snap shots captured of a static visual image of a dashboard screen from a corresponding dashboard user interface. As such, a retrieved dashboard view of a performance bookmark that is recalled from the bookmark system is live and supports user interaction.

20 Claims, 6 Drawing Sheets

(56) References Cited

U.S. PATENT DOCUMENTS

| | | |
|---|---|---|
| 7,058,701 B1 | 6/2006 | Bates et al. |
| 7,133,805 B1 | 11/2006 | Dankenbring et al. |
| 2002/0099578 A1 | 7/2002 | Eicher, Jr. et al. |
| 2002/0099598 A1 | 7/2002 | Eicher, Jr. et al. |
| 2002/0165757 A1 | 11/2002 | Lisser |
| 2002/0184043 A1 | 12/2002 | Lavorgna, Jr. et al. |
| 2002/0194090 A1* | 12/2002 | Gagnon ............ G06Q 10/06393 705/27 |
| 2003/0110249 A1 | 6/2003 | Buus et al. |
| 2003/0144868 A1 | 7/2003 | MacIntyre et al. |
| 2004/0102926 A1 | 5/2004 | Adendorff et al. |
| 2004/0153329 A1 | 8/2004 | Casati et al. |
| 2005/0071737 A1 | 3/2005 | Adendorff et al. |
| 2005/0154628 A1 | 7/2005 | Eckart et al. |
| 2005/0154769 A1 | 7/2005 | Eckart et al. |
| 2005/0210389 A1* | 9/2005 | Middelfart ............ G06F 16/283 715/730 |
| 2005/0216831 A1 | 9/2005 | Guzik et al. |
| 2005/0240467 A1 | 10/2005 | Eckart et al. |
| 2006/0004651 A1 | 1/2006 | Corr et al. |
| 2006/0036455 A1 | 2/2006 | Prasad et al. |
| 2006/0036595 A1 | 2/2006 | Gilfix et al. |
| 2006/0047565 A1 | 3/2006 | Gilfix et al. |
| 2007/0106952 A1 | 5/2007 | Matas et al. |
| 2007/0124676 A1 | 5/2007 | Amundsen et al. |
| 2007/0239573 A1* | 10/2007 | Tien ....................... G06Q 10/06 705/35 |
| 2007/0240119 A1 | 10/2007 | Ducheneaut et al. |
| 2007/0260625 A1 | 11/2007 | Tien et al. |
| 2008/0086345 A1 | 4/2008 | Wilson et al. |
| 2008/0178148 A1 | 7/2008 | Enyeart et al. |
| 2009/0157447 A1 | 6/2009 | Busch |

OTHER PUBLICATIONS

Kapoor, et al., "A technical framework for sense-and-response business management", IBM Systems Journal, vol. 44, No. 1, Jan. 2005, pp. 5-24.

Nicoli, Felix; International Search Report and Written Opinion; PCT Application No. PCT/EP2007/063952; dated Apr. 9, 2008; European Patent Office; Rijswijk Netherlands.

* cited by examiner

BUSINESS PERFORMANCE BOOKMARKS

CROSS-REFERENCE TO RELATED APPLICATION

This application is a continuation of copending U.S. patent application Ser. No. 11/624,785, filed Jan. 19, 2007, the entire contents and disclosure of which are hereby incorporated by reference herein.

BACKGROUND OF THE INVENTION

The present invention relates to systems, computer program products and computer methods for providing performance bookmarks that capture the state of business performance for advanced monitoring and analysis of business metrics.

A software "dashboard" is a tool that is used when managing a company's business performance by presenting role-based, content sensitive visibility of important business metrics in real time. Dashboard information can thus be utilized for monitoring and analyzing events in support of taking actions to improve and optimize a corresponding business. Examples of such metrics are the average response time of a supplier, the percentage of products failing quality control, the status of a particular order, the state of an insurance claim, the revenue stream of a retail product, the sales performance index for a particular geography, etc. Business metrics of particular business relevance are often called key performance indicators (KPis).

Dashboards typically present a "live" view of the current state of the monitored events, e.g., by querying KPis and then rendering the KPI data values through dashboard components such as gauges, tables and other visual metaphors. A dashboard is typically specific to a particular role within a business. Thus, the monitored events, and the visual display of those monitored events, may be configured in a manner appropriate to its corresponding role. For example, a vice president of insurance claims may determine a desired layout of a dashboard page, the collection of dashboard components to be used and the specific KPis to be viewed in the components. A sales executive may have an entirely different dashboard layout, which considers a different collection of dashboard components and corresponding KPis compared to the dashboard of the exemplary vice president of insurance claims. Regardless of the particular business role, dashboard layout or particular KPis, as the data values of the KPis change, the dashboard is immediately updated so as to provide a real time or near real time view of the state of the monitored events.

Typical dashboard applications address point in time issues by providing a specific dashboard component that shows the value of one or more KPis along a time dimension. However, the time display of a given dashboard component does not capture the complete context of the entire dashboard, but rather reflects historical values for a single KPI.

BRIEF SUMMARY OF THE INVENTION

The present invention provides a computer implemented method, system and computer program product to bookmark a dashboard view. A performance bookmark of a dashboard view is created in response to a triggering event. The triggering event may comprise for example, an operator requesting that the performance bookmark be created, e.g., using a suitable interface of the dashboard view. The triggering event may alternatively comprise a system response, such as recognition of a predetermined action, e.g., detecting that an action has been taken as a result of an operator observation of the data within the dashboard view. The triggering event may alternatively comprise, for example, automatically detecting a threshold condition or other parameter related to a dashboard system, an automated process that triggers continuously, periodically or at some predetermined interval.

The performance bookmark includes attributes such as a name and a timestamp, a reference to the visual properties of the dashboard view at the time that the performance bookmark is created and a reference to relationships of information displayed by the dashboard view at the time the performance bookmark is created. The performance bookmark may also include other attributes such as a description, action and/or role/ID. An operator of the dashboard may also retrieve previously created performance bookmarks, wherein recalling a select performance bookmark configures the dashboard view to correspond with the visual properties and relationships of information recorded at the time the select performance bookmark was created.

Performance bookmarks are instances and relationships, and are not limited to snap shots captured of a static visual image of a dashboard screen from a corresponding dashboard user interface. As such, a retrieved dashboard view of a performance bookmark that is recalled from the bookmark system is live and supports user interaction.

BRIEF DESCRIPTION OF THE SEVERAL VIEWS OF THE DRAWINGS

The following detailed description of various embodiments of the present invention can be best understood when read in conjunction with the following drawings, where like structure is indicated with like reference numerals, and in which.

DETAILED DESCRIPTION OF THE INVENTION

The various aspects of the present invention may be embodied as a computer method, a system or computer program product. Also, the present invention may take the form of an entirely hardware embodiment, an entirely software embodiment (including firmware, resident software, micro-code, etc.) or an embodiment combining software and hardware, wherein the embodiment or aspects thereof may be generally referred to herein as a "circuit," "module" or "system." Furthermore, the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate or transport the program for use by or in connection with an instruction execution system of a corresponding processing device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium.

More specific examples of the computer usable or computer readable medium comprise for example, an electrical connection having one or more wires, a swappable intermediate storage medium such as floppy drive, tape drive, external hard drive, a portable computer diskette, a hard disk, a random access memory (RAM), a read-only memory (ROM), an erasable programmable read-only memory (EPROM or Flash memory), a portable compact disc read-only memory (CD-ROM) or digital video disk (DVD), an optical fiber or storage device, or a transmission media such as those supporting the Internet or an intranet. The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wireline, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single computer, partly on one or more different computers, as a stand-alone software package, partly on a first computer and partly on a remote computer or entirely on the remote computer or server. In the latter scenario, the remote computer may be connected to the first computer through a network such as a local area network (LAN) or a wide area network (WAN), or the connection may be made to an external computer, for example, through the Internet using an Internet Service Provider.

The present invention is described below with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored m a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Figure 1:
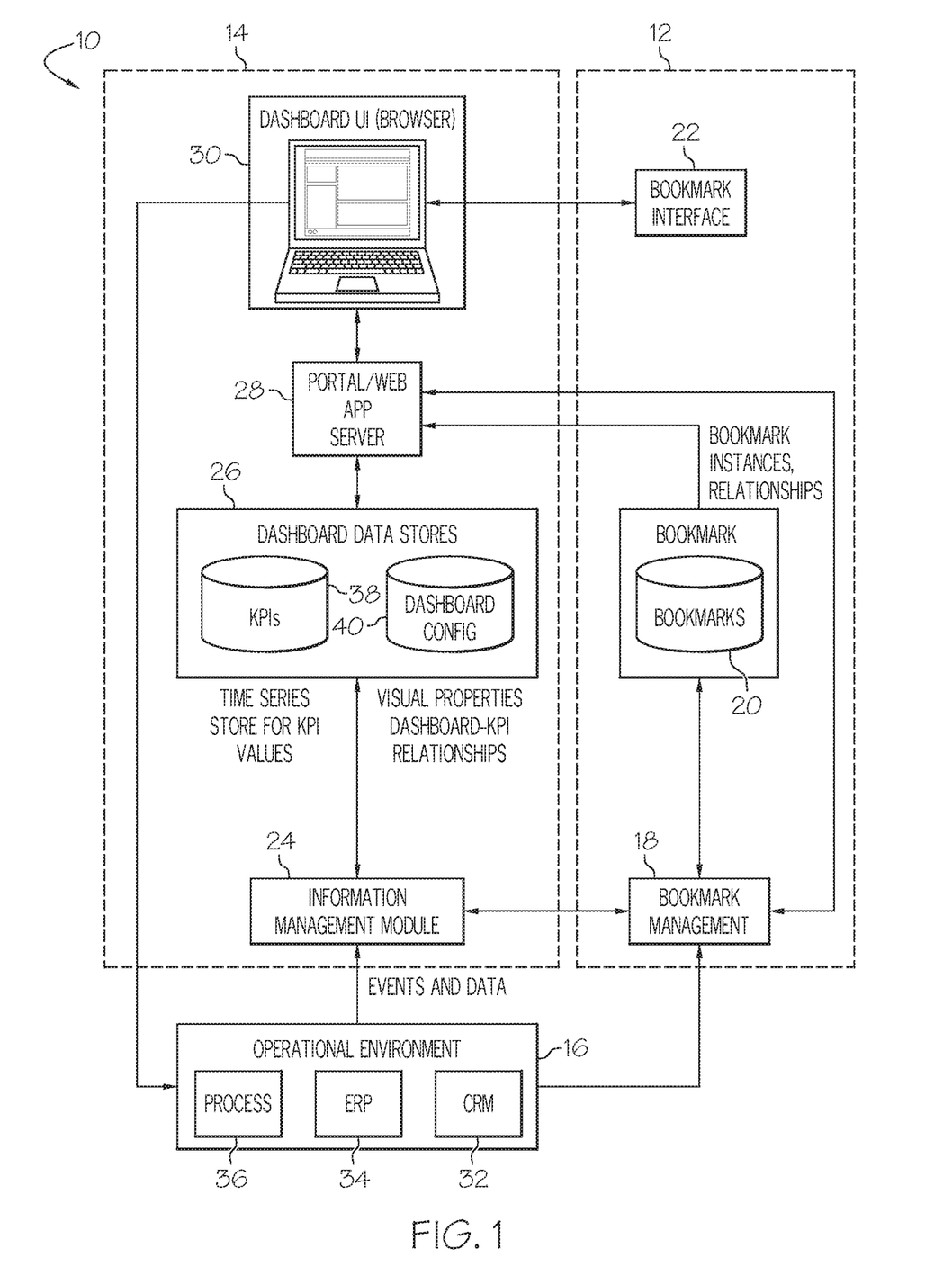
FIG. 1 is a block diagram of a bookmark system according to an aspect of the present invention.

Referring now to the drawings and particularly to FIG. 1, a business performance monitoring and analysis system 10 is illustrated. The system 10 includes generally, a bookmark system 12, a dashboard system 14 and an operational environment 16. The bookmark system 12 allows an operator to save performance bookmarks, recall performance bookmarks and otherwise interact with performance bookmarks as will be described in greater detail herein. The dashboard system 14 is software that provides role-based, context-sensitive visibility of information, such as for the purpose of monitoring and/or analyzing business performance in support of actions that are directed to optimizing and/or improving the business or operations thereof. For example, the dashboard system 14 typically provides a workspace that allows real-time monitoring of visualizations, metrics and other visual metaphors that are organized into a window or windows that are periodically updated. The dashboard system 14 thus allows decision makers, such as management, consultants, executives, etc., to monitor their business processes, customer relationships, supplier relationships and other matters of business concern on an up to date basis. The operational environment 16 is a computer supported environment that maintains systems, which may include for example, applications, processes and data of interest to the system 10.

The bookmark system 12 comprises a bookmark management module 18, a bookmark data store 20 and a bookmark interface module 22. As used herein, a data store may comprise one or more databases, including relational databases, arrays, lists, or other structures that store data. The dashboard system 14 comprises an information management module 24, dashboard data stores 26, an application portal 28 and a dashboard user interface 30. The information management module 24 interacts with the operational environment 16 in order to obtain appropriate business information that is provided to the dashboard user interface 30. In one exemplary application, the information obtained from the operational environment 16 comprises performance information relating to predefined Key Performance Indicators (KPis). As such, the information management module 24 is also referred to herein as a KPI management module 24.

The operational environment 16 may include, for example, a diverse number of processes, services software applications, databases, text, structured and unstructured documents, web pages, etc. For illustrative purposes, the operational environment 16 is shown as having customer relationship management software (CRM) 32, enterprise resource planning software (ERP) 34 and other miscellaneous process applications 36, which may include for example, workflow applications, office applications such as word processing, spreadsheet and database and presentation software.

The system 10 may be maintained on a single computer or the system 10 may be distributed across a network. Thus, the system 10 may be supported by networking components that interconnect the hardware and/or software processing devices, including for example, routers, hubs, firewalls, network interfaces wired or wireless communications links and corresponding interconnections. Moreover, the network may comprise connections using one or more intranets, extranets, local area networks (LAN), wide area networks (WAN), wireless networks (WIFI), the Internet, including the world wide web, and/or other arrangements for enabling communication between processing devices, in either real time or otherwise, e.g., via time shifting, batch processing, etc.

Moreover, the dashboard user interface 30 may be supported by any suitable processing device platform. Typical processing devices may include for example, servers, personal computers, notebook computers, transactional systems, appliance or pervasive computing devices such as a personal data assistant (PDA), palm computers, cellular access processing devices, special purpose computing devices and/or other devices capable of interacting with the system 10.

Figure 2:
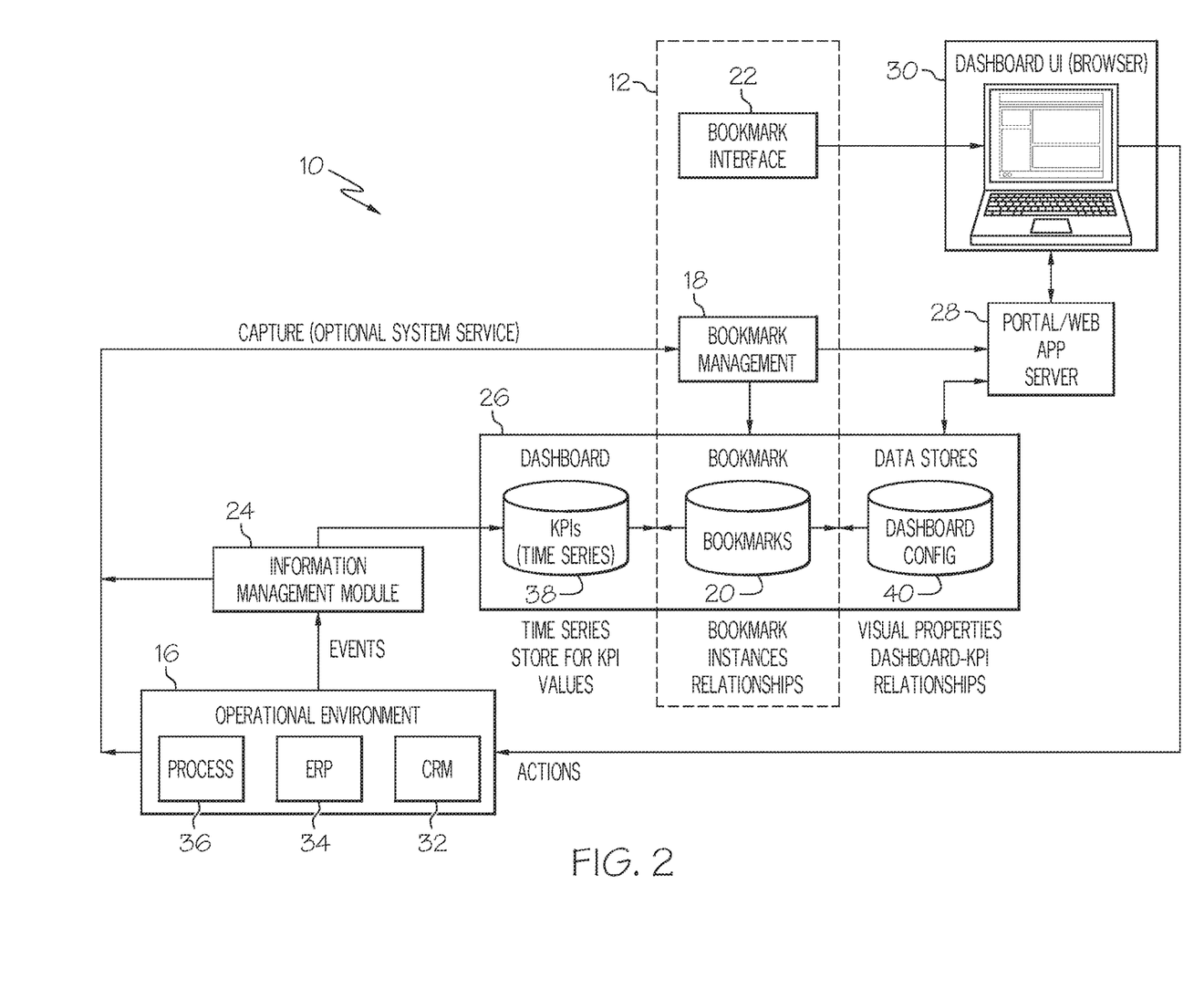
FIG. 2 is block diagram of a bookmark system according to an aspect of the present invention.

The data obtained by the information management module 24 from the operational environment 16 is transformed into information that may be of interest to an operator of the dashboard user interface 30. As noted above, in one exemplary application, the information obtained from the operational environment 16 comprises performance information relating to predefined Key Performance Indicators (KPis). Under this arrangement, the KPis are stored in a KPI data store 38. The KPI data store 38 is provided as part of the dashboard data stores 26 as illustrated. However, the KPI data store 38 may be located in any convenient physical or logical location that is accessible by the information management module 24. Referring to FIG. 2, system 10 is the same as that described with reference to FIG. 1. However, the performance bookmark data store 20 is alternatively illustrated as being stored within or as part of the dashboard data store 26, e.g., logically or physically stored as part of the same relational database, data store or other data storage structure used to maintain the KPI database or as a separate logical data structure within the dashboard data store 26.

Referring to FIGS. 1 and 2 generally, KPis are meaningful indicators of performance relative to expectations. KPis are sometimes provided in the form of targets and thresholds, and comprise measurable, definable metrics used to signify information of interest to an operator of the system 10. As a few examples, KPis may comprise total customers, average sale per customer, total sales by region, productivity of employees, etc. KPis are also often tied to strategies, goals or other objectives and require careful design and implementation in order yield intended results. As such, KPis may not remain static but may be modified, added, deleted, etc. Moreover, KPis may be provided in a number of different forms, such as targets or thresholds. An exemplary target may comprise a number of newly added customers. An exemplary threshold may comprise revenue growth rate, which may be characterized by a threshold consisting of a singular value or range of values.

Although some KP is may be characterized by historical information, e.g., trends in sales, growth of income by year, number of products shipped by month, etc., in general, KPis are biased toward real-time data. As such, the information management module 24 computes point-in-time actual values of KPis and updates the determined values for the predefined KPis, which are provided to the dashboard user interface 30 in real time or near real-time as the underlying data from the operational environment 16 changes. Accordingly, the KPI data store 38 maintains a times series of KPI values.

The KPis may be derived from any combination of data available from the operational environment 16. The particular data required from the operational environment 16 to compute a current value for a given KPI will thus depend upon the definition of that KPI. Moreover, KPis may be dependent or otherwise relate to or cross-reference one another. For example, a KPI that defines profit by year may relate to (or otherwise be derived from) a profit by month KPI for each of twelve consecutive months and a corresponding expense KPI for each of the twelve consecutive months.

The information from the KPI data store 38 is retrieved by the portal 28 and is coupled to the dashboard user interface 30 in an appropriate manner, such as may be dictated by the selected visual metaphor utilized to visualize the underlying data. The portal 28 may be implemented by any suitable means for conveying information from the dashboard data stores 26 to the dashboard user interface 30. For example, the portal 28 may comprise a service, agent, a network based applications server, web server etc.

The dashboard user interface 30 is a customizable visualization tool that associates at least one KPI with visual indicia. The visualization may comprise graphs, charts, lists, tables, alarms, and other visual aids to analyze and interpret the displayed KPIs. As the KPI values change over time, the view in the dashboard user interface 30 is updated to reflect the appropriate changes. The available KPis can be filtered, sorted and displayed in any appropriate manner. Accordingly, the dashboard data stores 26 may further comprise a dashboard configuration data store 40 that stores various configurations, views and other information that defines the visual presentation of the KPI information.

The bookmark system 12 provides a mechanism to capture the state of the business performance as viewed through the dashboard user interface 30 for a particular point in time, and to retain that state of the data at that time for advanced monitoring and analysis. As such, the bookmark system 12 enables an operator the capability to capture, index, retrieve and use "performance bookmarks" of business performance information as measured at a previous point in time by the dashboard system 10.

Performance bookmarks are instances and relationships, and are not limited to snap shots captured of a static visual image of a dashboard screen from the dashboard user interface 30. As such, a retrieved dashboard view of a performance bookmark that is recalled from the bookmark system 12 is live and supports user interaction. The recalled performance bookmark may also allow subsequent filtering of displayed content, and/or the ability to separate the specific presentation mechanism from the saved state, allowing subsequent viewing to be performed through a variety of mechanisms and devices.

The bookmark management module 18 communicates with the information management module 24 and other system components to obtain the necessary information to create and construct a performance bookmark, which will be described in greater detail herein. The obtained information is written to the bookmark data store 20 when a performance bookmark is created. The bookmark management module 18 further communicates with the portal 28, e.g., so that stored instances of performance bookmarks can be reconstructed and displayed on the dashboard user interface 30. The bookmark interface 22 is a module that provides tools, e.g., within the dashboard user interface 30, that can be utilized by an operator so as to trigger and control the creation, recall and other manipulations (including interactive and administrative manipulations) of performance bookmarks.

Value may be derived in certain situations by the combination of multiple performance bookmarks over time, which are utilized to replay the state of the business across time, and to compare performance trends in a broader context than what would otherwise be available with a single KPI. Accordingly, the bookmark interface 22 may allow the operator to interact with the view defined by the recalled instance of the performance bookmark, e.g., to drill down on KPI values, and/or to replay the dashboard in time, which may cross one or more instances of performance bookmarks.

As noted in FIG. 1, the dashboard user interface 30 may provide feedback to the operational environment 16, e.g., to implement a decided-upon action based on an analysis of KPI information displayed on the dashboard user interface 30. For example, an action may be performed by a human or system component, typically in the context of managing or improving performance. An action may comprise for example, locating a new supplier, suspending a business process, redistributing available stock or other resources, etc. As such, a performance bookmark saved in the bookmark data store 20 may maintain actions and/or corresponding decisions that were taken in addition to appropriate point-in-time values for subsequent use in auditing the business actions. Thus, the performance bookmarks may also be utilized to evaluate actions taken for accountability purposes as will be described in greater detail herein.

Figure 3:
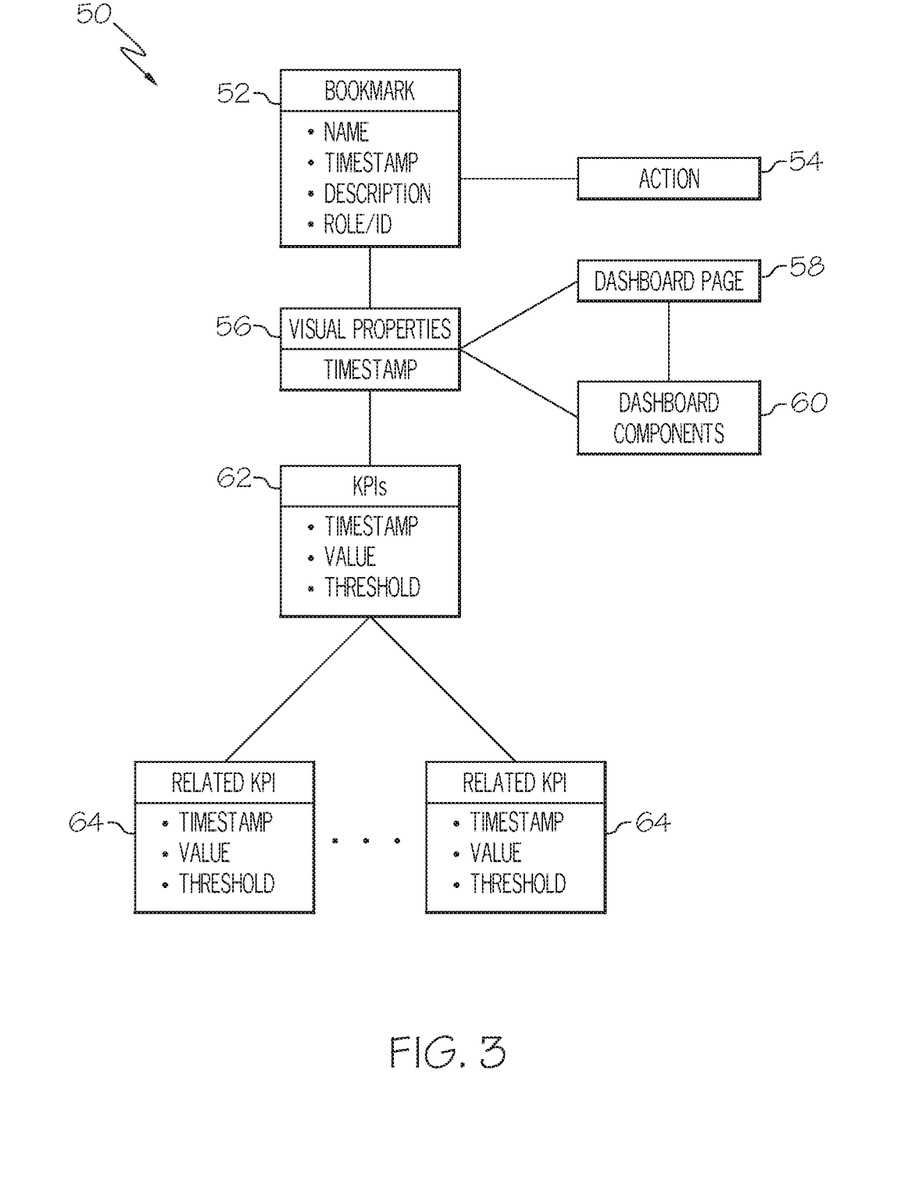
FIG. 3 illustrates a block diagram of a bookmark data structure that can be utilized with the bookmark system of FIGS. 1 and/or 2.

Referring to FIG. 3, an exemplary data structure for a bookmark 50 is illustrated. The bookmark 50 includes a bookmark data page 52, which comprises attributes such as a name field and a timestamp. The name field identifies the bookmark 50 and may be entered by an operator, e.g., by using an appropriate data entry box provided by the bookmark interface 22 within the dashboard user interface 30. Alternatively, a name may be automatically generated and entered into the name field by a process, service or other component of the system 10, or the name field may be filled in with a name by a combination of automatic generation and operator entry.

The timestamp can take any suitable form and identifies a suitable reference in time to the creation of a particular instance of a bookmark 50. The time stamp may also be utilized to identify relevant information associated with the bookmark 50, e.g., by identifying the constituent components of the dashboard view and corresponding data associated with the particular instance of a bookmark based upon the information contained within, linked to or otherwise identified by the data structure of the bookmark 50. The data page 52 may also contain attributes such as a description field or other suitable fields to store relevant information that may be used for locating, retrieving, organizing or otherwise manipulating previously saved bookmarks 50. The data page 52 may also comprise a Role/ID attribute, which characterizes the role of the dashboard.

For example, the bookmark interface 22 (shown in FIGS. 1 and 2) may include a search tool that allows an operator to locate performance bookmarks of interest, e.g., by searching based upon criteria such as name, description, timestamp, role/ID or other uniquely identifying characteristics. Moreover, the bookmark interface 22 may include administrative functions, e.g., to organize, edit, add, sort, arrange and/or delete instances of bookmarks 50.

As noted in greater detail above, the operator of the dashboard system 10 may implement actions that affect business processes. This is schematically represented in FIG. 1, for example, by the communication of the dashboard user interface 30 with the operational environment 16. Correspondingly, the bookmark data structure, e.g., the data page 52 may associate with a record of actions 54, which can correspond to action(s), results, events and other characterizations of operator interaction with the dashboard user interface 30 that results in business action.

The bookmark 50 is further associated with a dashboard visual properties page 56. As noted in greater detail herein, each bookmark 50 is associated with the state of a dashboard view on the dashboard user interface 30, e.g., as of the time that the bookmark 50 is created or edited. Accordingly, the dashboard visual properties page 56 may be further conceptualized as having a dashboard page 58 and corresponding dashboard components page 60. The dashboard visual properties 56 (including the optional dashboard page 58 and corresponding dashboard components 60) may be stored as part of the bookmark store 20, the dashboard configuration store 40 or some other suitable storage arrangement.

According to an aspect of the present invention, a visual image of a dashboard screen is captured from the dashboard user interface 30, e.g., to a file or as an animated screen movie such as a flash animation or AVI file format, which may be saved, for example, in the dashboard configuration data store 26, within the bookmark data store 20 or within any other suitable storage location which is accessible to the system to capture the dashboard layout at the time that a performance bookmark is created.

At a technical implementation level, the dashboard user interface 30 may be compared to the granularity of a web page. The dashboard components 60 are constituent elements of the corresponding dashboard page 58 that displays a discrete set of information, answering a specific business question or supporting specific types of actions. These dashboard components 60 may interact and share information to implement the specific visual metaphor. Additional suitable information may be stored with the visual properties, e.g., a corresponding time stamp, etc.

The bookmark 50 further comprises information that associates KPis 62 corresponding to the view of the dashboard user interface 30. Optionally, the performance bookmark may also associate related KPis 64 to corresponding KPis 62, which allows, for example, drill down and other interactive features of the corresponding bookmark 50. To support drill down, the system 10 must determine what KPI values must be retained in order to support drill-down. One exemplary approach utilizes a reachability graph. Under this arrangement, the depth of the drill-down state to be captured may be a configurable parameter of the graph.

Figure 4:
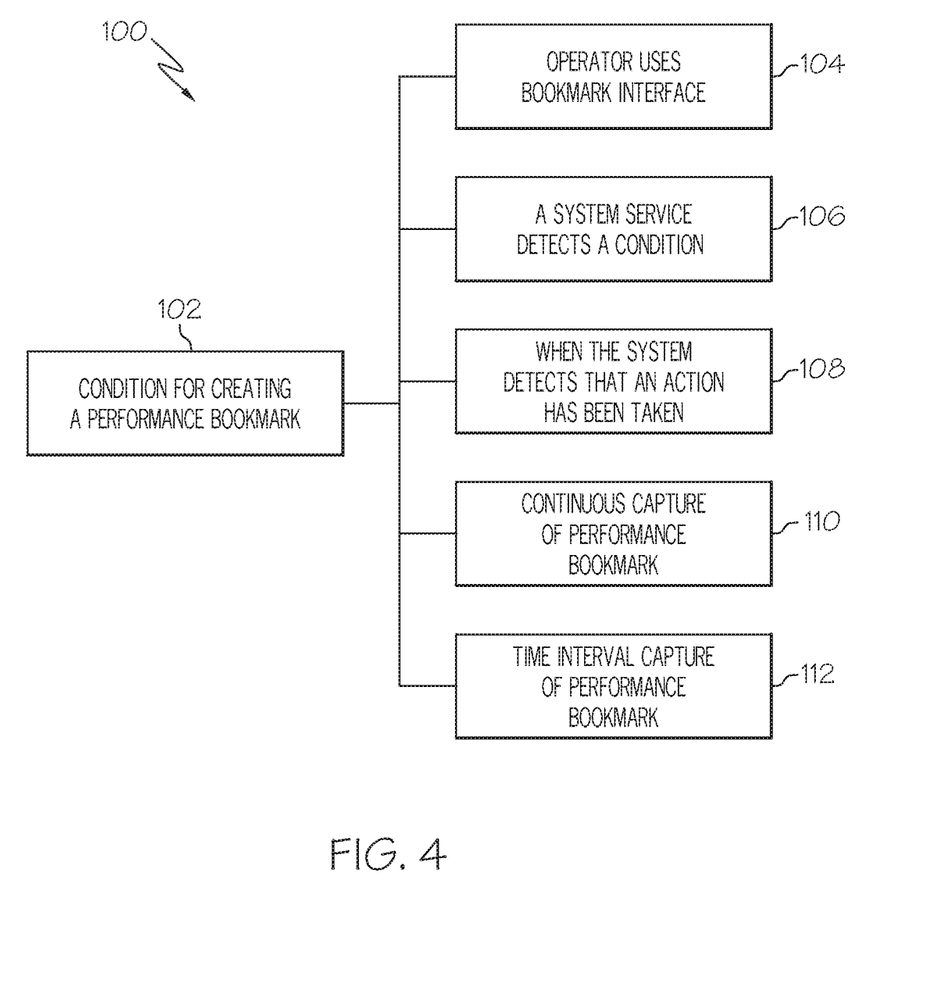
FIG. 4 is a chart illustrating exemplary alternatives for triggering the creation of a bookmark according to the various exemplary aspects of the present invention.

Referring to FIG. 4, a chart 100 illustrates some exemplary triggering events that establish a condition 102 which may be utilized to trigger the creation of a performance bookmark 50. For example, an operator can manually create a performance bookmark at 104, such as by using the bookmark interface 22. Thus, the bookmark interface 22 defines a module that can detect a triggering event, such as an operator selecting a suitable menu option, selecting a button, box or other icon to cause an instance of a performance bookmark 50 to be created. A system service or other module, e.g., the bookmark management module 18, the information management module 24 or other component of the system 10 may detect a condition under which a performance bookmark 50 should be created. Once detected, the bookmark management module 18 may automatically create and store a performance bookmark at 106. As an alternative, the operator may be prompted, e.g., via the bookmark interface 22, as to whether a bookmark 50 should be created.

As an example, the system 10 may include a system service, e.g., provided as a component of either the bookmark management module 18 or the information management module 24, that automatically creates performance bookmarks when predetermined business situations are detected. The system 10 may then alert a human operator to the situation, and provide a reference to the created bookmark. Under this approach, the operator can retrieve the created performance bookmark and understand the specific context of the environment at the time that the situation was detected.

As noted in greater detail herein, a bookmark 50 may also be created when the system detects that an action has been taken, e.g., as a result of interaction with the dashboard at 108. Under this arrangement, the action may be associated with the performance bookmark as set out in greater detail herein. Performance bookmarks may also be continuously captured, such as at 110, or periodically captured at 112, such as by capturing a performance bookmark every predetermined time period.

Once a bookmark 50 has been established, a large number of capabilities become available to the operator. For example, a bookmark 50 may be retrieved, e.g., using the bookmark interface 22. Once retrieved and loaded into the dashboard user interface 30, an operator may interact with data from the past, e.g., perform drill-downs on KPI values, e.g., in the context of the historical snapshot, including the point in time KPI thresholds and targets. As another example, performance bookmarks 50 may be published. Once published, multiple parties can see point in time KPI values and interact with the dashboard view that is captured as part of the bookmark 50 to facilitate collaborative decision making.

In addition to locating and replaying historical KPI information, the bookmark interface 22 may allow a user to perform filtering functions, e.g., by selecting which KPis to view in the bookmarked dashboard view, and/or to rewind, pause, and replay the dashboard view, which may span across multiple bookmarks. Still further, the system may be capable of showing trends, such as by showing trends of KPI values between instances of performance bookmarks 50.

As another example, an operator may set a bookmark 50 so as to preserve business information for audit, reconciliation and other purposes where a given bookmark 50 includes data associated with a business action. In one illustrative example, if a decision is made as a result of viewing a dashboard, the state of the KPis that were used to base the action may be recorded and associated with the decision, such as by setting a bookmark 50 and by setting the corresponding action data in the action field 54. When an action is taken in the context of the dashboard, the system 10 may also be able to automatically (or manually) set a bookmark 50 and associate the action with the bookmark 50.

Figure 5:
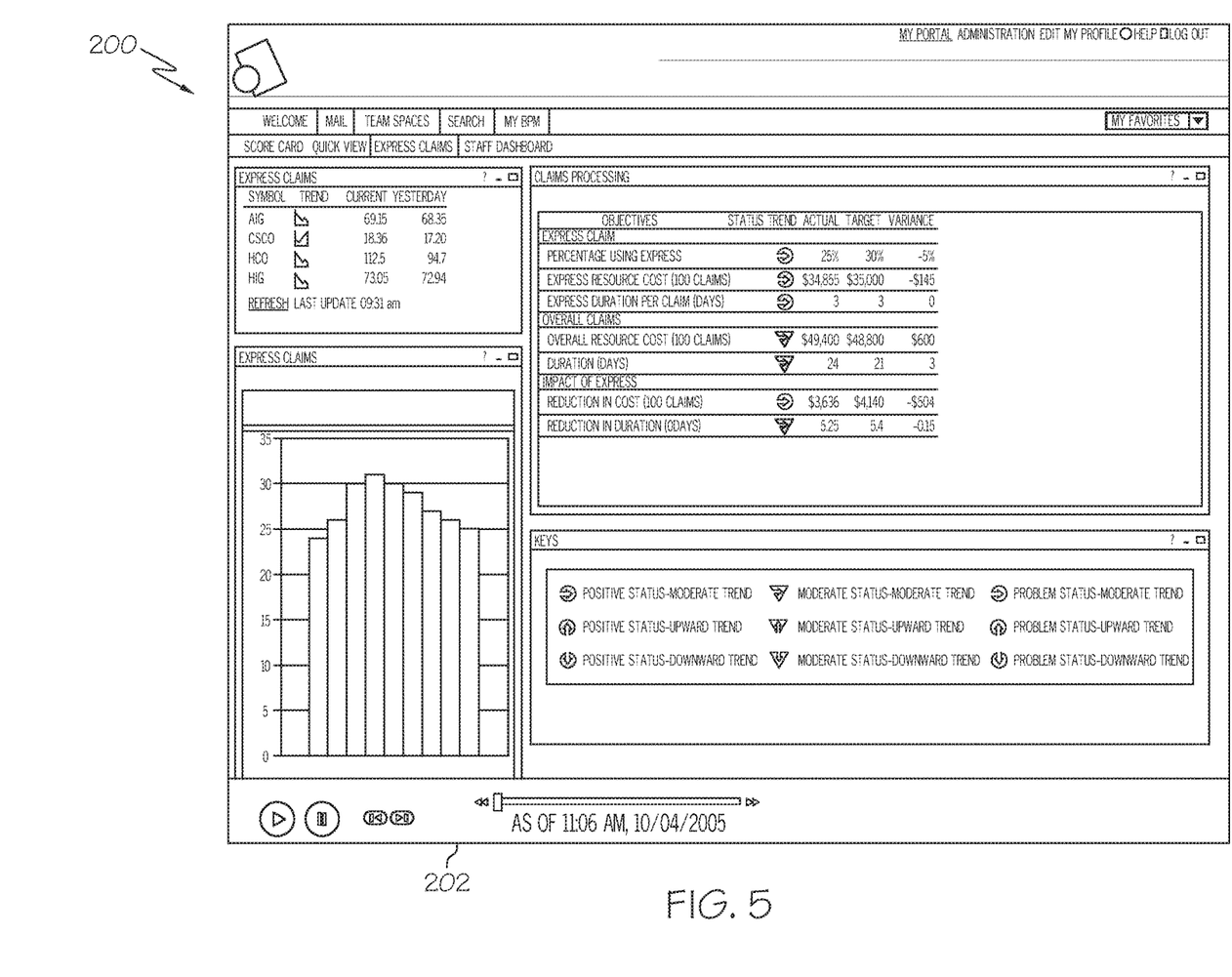
FIG. 5 is an illustrative screen display of a dashboard having a bookmark interface implemented as navigational bar at the bottom of the screen.
Figure 6:
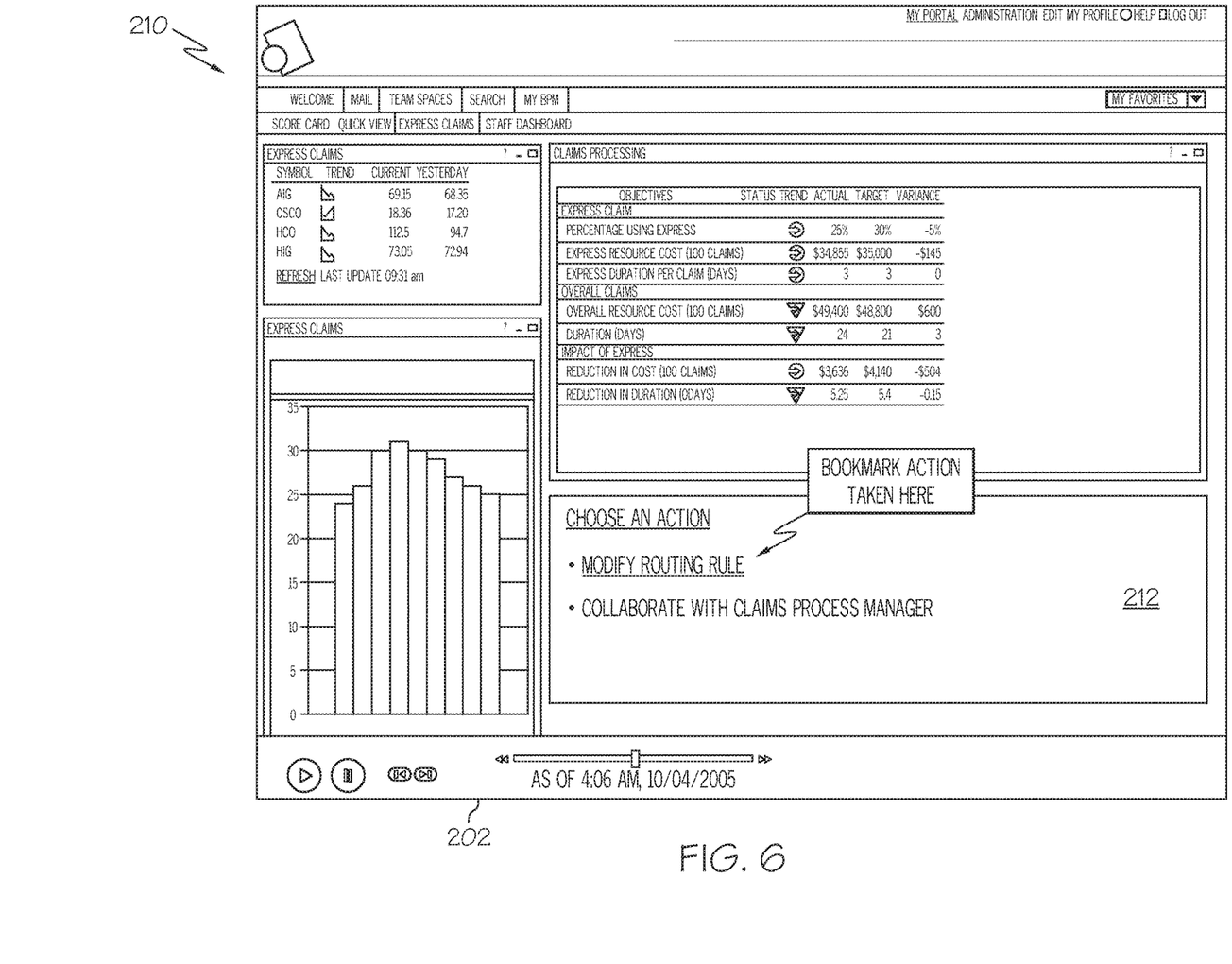
FIG. 6 is an illustrative screen display of a dashboard having a bookmark, where an action event is recorded.

Referring to FIG. 5, a screen shot 200 of an exemplary dashboard user interface 30 is illustrated. As shown, the bookmark interface 22 consists of a transport bar 202 located towards the bottom of the screen. The transport bar 202 provides buttons, sliders and other objects that allow an operator to navigate through instances of performance bookmarks, such as by fast forwarding, rewinding, playing, pausing etc. Referring to FIG. 6, a screenshot 210 illustrates another exemplary dashboard user interface 30. As shown, an action has been taken at 212 by selecting a Modify Routing Rule option, which is captured and stored as part of a performance bookmark.

The system 10 may also include administrative capabilities, such as may be required to manage and organize created performance bookmarks.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the method of this invention, and to the extent that a particular system configuration is capable of performing the method of this invention, it is equivalent to the representative computer system and within the scope of this invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms"comprises" and/or comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of bookmarking a dashboard view in a dashboard system, the method comprising:
    obtaining, by an information management module of a dashboard system of a computer, specified performance information from an operational environment, and transforming the information into specified metrics and visual metaphors;
    displaying, by a dashboard user interface of the dashboard system, a visualization of said specified metrics and visual metaphors in a dashboard view for monitoring the visualizations of the metrics and visual metaphors to monitor the specified performance information from the operational environment, the specified performance information comprising a plurality of key performance indicators (KPis);
    providing, via said dashboard user interface, user selectable options for taking corresponding predetermined actions affecting a business process;
    detecting a triggering event responsive to a predetermined action taken in response to a user selection of an option via said dashboard user interface;
    in response to detecting the triggering event, automatically constructing, by the computer, a performance bookmark of the dashboard view to capture a state of the specified performance information, as viewed through the dashboard user interface, for a specified time, said bookmark further comprising information associating said predetermined action and KPis corresponding to a view of the dashboard user interface and associating related KPis to the corresponding KPis;
    storing, by the computer, the constructed performance bookmark;
    receiving, by the computer, from the dashboard user interface, instructions to recall the constructed performance bookmark;
    in response to the instructions, recalling, by the computer, the constructed performance bookmark;
    based on the recalled constructed performance bookmark, configuring, by the computer, the dashboard system to display on the dashboard user interface, in a recalled dashboard view, the specified metrics and visual metaphors for the specified performance information when said performance bookmark was constructed and the corresponding KPis that were used to base the action taken to enable an operator to retrieve and use the information of the recalled dashboard view as measured at a previous point in time to evaluate the action taken; and
    the operator interacting with the recalled dashboard view to interact with data from the past, wherein the operator interacting with the data from the past includes the operator performing a drill-down on the specified performance information, said drill down comprising:
        utilizing a reachability graph to retain values of said associated KPis; and
        configuring a parameter of said reachability graph to specify a depth of a drill-down state to be captured.

2. The method according to claim 1, wherein the operator interacting with the recalled dashboard view to interact with data from the past includes the operator performing filtering functions on the specified performance information.

3. The method according to claim 2, wherein:
    the operator performing filtering functions on the specified performance information includes the operator selecting ones of the KPIs to view in the recalled dashboard view.

4. The method according to claim 1, wherein the operator interacting with the recalled dashboard view to interact with data from the past includes the operator rewinding the recalled dashboard view.

5. The method according to claim 1, wherein the operator interacting with the recalled dashboard view to interact with data from the past includes the operator pausing the recalled dashboard view.

6. The method according to claim 1, wherein the operator interacting with the recalled dashboard view to interact with data from the past includes the operator replaying the recalled dashboard view.

7. The method according to claim 1, wherein the constructing a performance bookmark of the dashboard view includes capturing performance bookmarks at predetermined time periods.

8. The method according to claim 7, wherein the recalled dashboard view spans across multiple ones of the captured performance bookmarks.

9. The method according to claim 8, wherein:
    the recalled dashboard view shows trends of the KPIs between the captured performance bookmarks.

10. A system to bookmark a dashboard view in a dashboard system, comprising:
    one or more processor units; and
    a memory unit in communication with the one or more processor units, the memory unit storing executable code, executable by the one or more processor units to:
        obtain specified performance information from an operational environment, and transform the information into specified metrics and visual metaphors;

display by a dashboard user interface of the dashboard system, a visualization of said specified metrics and visual metaphors in a dashboard view for monitoring the visualizations of the metrics and visual metaphors to monitor the specified performance information from the operational environment, the specified performance information comprising a plurality of key performance indicators (KPis);

provide, via said dashboard user interface, user selectable options for taking corresponding predetermined actions affecting a business process;

detect a triggering event responsive to a predetermined action taken in response to a user selection of an option via said dashboard user interface;

in response to detecting the triggering event, automatically construct a performance bookmark of the dashboard view to capture a state of the specified performance information, as viewed through the dashboard user interface, for a specified time, said bookmark further comprising information associating said predetermined action and KPis corresponding to a view of the dashboard user interface and associating related KPis to the corresponding KPis;

store the constructed performance bookmark;

receive by the computer, from the dashboard user interface, instructions to recall the constructed performance bookmark;

in response to the instructions, recall the constructed performance bookmark;

based on the recalled constructed performance bookmark, configure the dashboard system to display on the dashboard user interface, in a recalled dashboard view, the specified metrics and visual metaphors for the specified performance information when said performance bookmark was constructed and the corresponding KPis that were used to base the action taken to enable an operator to retrieve and use the information of the recalled dashboard view as measured at a previous point in time to evaluate the action taken; and receive from the operator interactions with the recalled dashboard view to interact with data from the past, wherein the operator interacting with the data from the past includes the operator performing a drill-down on the specified performance information, and to perform said drill down, said code is executed by the one or more processor units to:

utilize a reachability graph to retain values of said associated KPis; and configure a parameter of said reachability graph to specify a depth of a drill-down state to be captured.

11. The method according to claim 1, further comprising:
in response to detecting a second triggering event at another point in time, constructing, by the computer, a second performance bookmark of the dashboard view to capture a state of the specified performance information;

providing, by the computer, bookmark navigational tools in the dashboard user interface; and receiving a selection of one of the bookmark navigational tools from the user, the bookmark navigational tools corresponding to at least one of: rewinding or replaying data displayed in the recalled constructed performance bookmark of said dashboard across to the second performance bookmark.

12. The system to bookmark a dashboard view according to claim 10, wherein the operator interactions with the recalled dashboard view to interact with data from the past includes the operator performing filtering functions on the specified performance information.

13. The system to bookmark a dashboard view according to claim 12, wherein:
the operator performing filtering functions on the specified performance information includes the operator selecting ones of the KPIs to view in the recalled dashboard view.

14. The system to bookmark a dashboard view according to claim 11, wherein:
the construct a performance bookmark of the dashboard view includes capturing performance bookmarks at predetermined time periods;
the recalled dashboard view spans across multiple ones of the captured performance bookmarks; and
the recalled dashboard view shows trends of the KPIs between the captured performance bookmarks.

15. A computer program product executable by a computer, to bookmark a dashboard view in a dashboard system, the computer program product comprising:
a non-transitory computer usable medium having computer usable program code embodied therewith, executable by the computer, the computer usable program code comprising:

computer usable program code configured, when executed by the computer, to obtain specified performance information from an operational environment, and transform the information into specified metrics and visual metaphors;

computer usable program code configured, when executed by the computer, to display by a dashboard user interface of the dashboard system, a visualization of said specified metrics and visual metaphors in a dashboard view for monitoring the visualizations of the metrics and visual metaphors to monitor the specified performance information from the operational environment, the specified performance information comprising a plurality of key performance indicators (KPIs);

computer usable program code configured, when executed by the computer, to provide, via said dashboard user interface, user selectable options for taking corresponding predetermined actions affecting a business process;

computer usable program code configured, when executed by the computer, to detect a triggering event responsive to a predetermined action taken in response to a user selection of an option via said dashboard user interface;

computer usable program code configured, when executed by the computer, to, in response to detecting the triggering event, construct a performance bookmark of the dashboard view to capture a state of the specified performance information, as viewed through the dashboard user interface, for a specified time, said bookmark further comprising information associating said predetermined action and KPis corresponding to a view of the dashboard user interface and associating related KPis to the corresponding KPis;

computer usable program code configured, when executed by the computer, to store the constructed performance bookmark;

computer usable program code configured, when executed by the computer, to receive by the computer, from the dashboard user interface, instructions to recall the constructed performance bookmark;

computer usable program code configured, when executed by the computer, to, in response to the instructions, recall the constructed performance bookmark;

computer usable program code configured, when executed by the computer, to, based on the recalled constructed performance bookmark, configure the dashboard system to display on the dashboard user interface, in a recalled dashboard view, the specified metrics and visual metaphors for the specified performance information when said performance bookmark was constructed and the corresponding KPis that were used to base the action taken to enable an operator to retrieve and use the information of the recalled dashboard view as measured at a previous point in time to evaluate the action taken; and receive from the operator interactions with the recalled dashboard view to interact with data from the past, wherein the operator interacting with the data from the past includes the operator performing a drill-down on the specified performance information, and to perform said drill down, said computer usable program code is configured, when executed by the computer, to:

utilize a reachability graph to retain values of said associated KPis; and configure a parameter of said reachability graph to specify a depth of a drill-down state to be captured.

16. The system according to claim 11, wherein the processor is further executed to:

in response to detecting a second triggering event at another point in time, construct, by the computer, a second performance bookmark of the dashboard view to capture a state of the specified performance information;

provide, by the computer, bookmark navigational tools in the dashboard user interface; and receive a selection of one of the bookmark navigational tools from the user, the bookmark navigational tools corresponding to at least one of: rewinding or replaying data displayed in the recalled constructed performance bookmark of said dashboard across to the second performance bookmark.

17. The computer program product according to claim 15, wherein the operator interactions with the recalled dashboard view to interact with data from the past includes the operator performing filtering functions on the specified performance information.

18. The computer program product according to claim 17, wherein:

the operator performing filtering functions on the specified performance information includes the operator selecting ones of the KPIs to view in the recalled dashboard view.

19. The computer program product according to claim 18, wherein:

the construct a performance bookmark of the dashboard view includes capturing performance bookmarks at predetermined time periods;

the recalled dashboard view spans across multiple ones of the captured performance bookmarks; and the recalled dashboard view shows trends of the KPIs between the captured performance bookmarks.

20. The computer program product according to claim 16, wherein the computer usable program code, when executed by the computer, configures the computer to:

in response to detecting a second triggering event at another point in time, construct a second performance bookmark of the dashboard view to capture a state of the specified performance information;

provide bookmark navigational tools in the dashboard user interface; and receive a selection of one of the bookmark navigational tools from the user, the bookmark navigational tools corresponding to at least one of: rewinding or replaying data displayed in the recalled constructed performance bookmark of said dashboard across to the second performance bookmark.

* * * * *